United States Patent
Pipitone et al.

(10) Patent No.: US 9,014,831 B2
(45) Date of Patent: Apr. 21, 2015

(54) SERVER SIDE AUDIO FILE BEAT MIXING

(75) Inventors: Michael Joseph Pipitone, Washington, DC (US); Jarom Roger Lee, Salt Lake City, UT (US); Michael Daren Babbitt, Salt Lake City, UT (US); John B. Boardman, Honolulu, HI (US); Mauro Farina, Lugagnano (IT)

(73) Assignee: Cassanova Group, LLC, Washington, DC (US)

( * ) Notice: Subject to any disclaimer, the term of this patent is extended or adjusted under 35 U.S.C. 154(b) by 629 days.

(21) Appl. No.: 12/424,503

(22) Filed: Apr. 15, 2009

(65) Prior Publication Data

US 2009/0259326 A1  Oct. 15, 2009

Related U.S. Application Data

(60) Provisional application No. 61/045,186, filed on Apr. 15, 2008.

(51) Int. Cl.
*G06F 17/00* (2006.01)
*H04N 7/173* (2011.01)
*G10H 1/00* (2006.01)
*G11B 27/034* (2006.01)
*H04N 21/233* (2011.01)
*H04N 21/235* (2011.01)
*H04N 21/266* (2011.01)
*H04N 21/472* (2011.01)
*H04N 21/6408* (2011.01)
*H04N 21/81* (2011.01)

(52) U.S. Cl.
CPC ......... *H04N 7/17318* (2013.01); *G10H 1/0025* (2013.01); *G10H 2210/061* (2013.01); *G10H 2210/076* (2013.01); *G10H 2240/135* (2013.01); *G10H 2250/035* (2013.01); *G11B 27/034* (2013.01); *H04N 21/233* (2013.01); *H04N 21/2353* (2013.01); *H04N 21/26616* (2013.01); *H04N 21/47202* (2013.01); *H04N 21/6408* (2013.01); *H04N 21/8113* (2013.01); *H04N 21/8193* (2013.01)

(58) Field of Classification Search
CPC ................. H04H 60/04; G11B 27/038; G10H 2210/125; G10H 2210/76; G10H 2210/105; G10H 1/0025; G10H 2240/016; G10H 2240/325; G10H 2250/035
USPC ........................... 700/94; 369/1–12; 381/119; 704/500–504; 84/611, 612
See application file for complete search history.

(56) References Cited

U.S. PATENT DOCUMENTS

2001/0039872 A1 * 11/2001 Cliff ................................. 84/609
2003/0183064 A1 * 10/2003 Eugene et al. .................. 84/609

(Continued)

*Primary Examiner* — Andrew C Flanders
(74) *Attorney, Agent, or Firm* — TraskBritt, P.C.

(57) ABSTRACT

A server-side audio file beat mixing device and method are provided that enable users to create custom "DJ-style Beat Mixed" play lists of songs that are then mixed continuously on a host computer server matching beats of preset mix length, layering and mixing in of transitional sounds/effects, imposing audio processing technologies, and finally converting to a compressed audio format and delivered back to the customer for download, or shipped as a CD. Currently, multi-track editing programs like Sony Acid allow users to mix songs on their computers to create DJ-style mixed programs; however, this and all local computer software-based solutions require significant user skill, patience and time as well as computer processing power to accomplish similar results. This invention provides a better, easier solution that takes the time-intensive mixing process out of the user's hands.

16 Claims, 3 Drawing Sheets

(56) References Cited

U.S. PATENT DOCUMENTS

| | | | |
|---|---|---|---|
| 2005/0144016 A1* | 6/2005 | Hewitt et al. | 704/278 |
| 2008/0314232 A1* | 12/2008 | Hansson et al. | 84/625 |
| 2009/0049979 A1* | 2/2009 | Naik et al. | 84/636 |
| 2009/0272253 A1* | 11/2009 | Yamashita et al. | 84/611 |

* cited by examiner

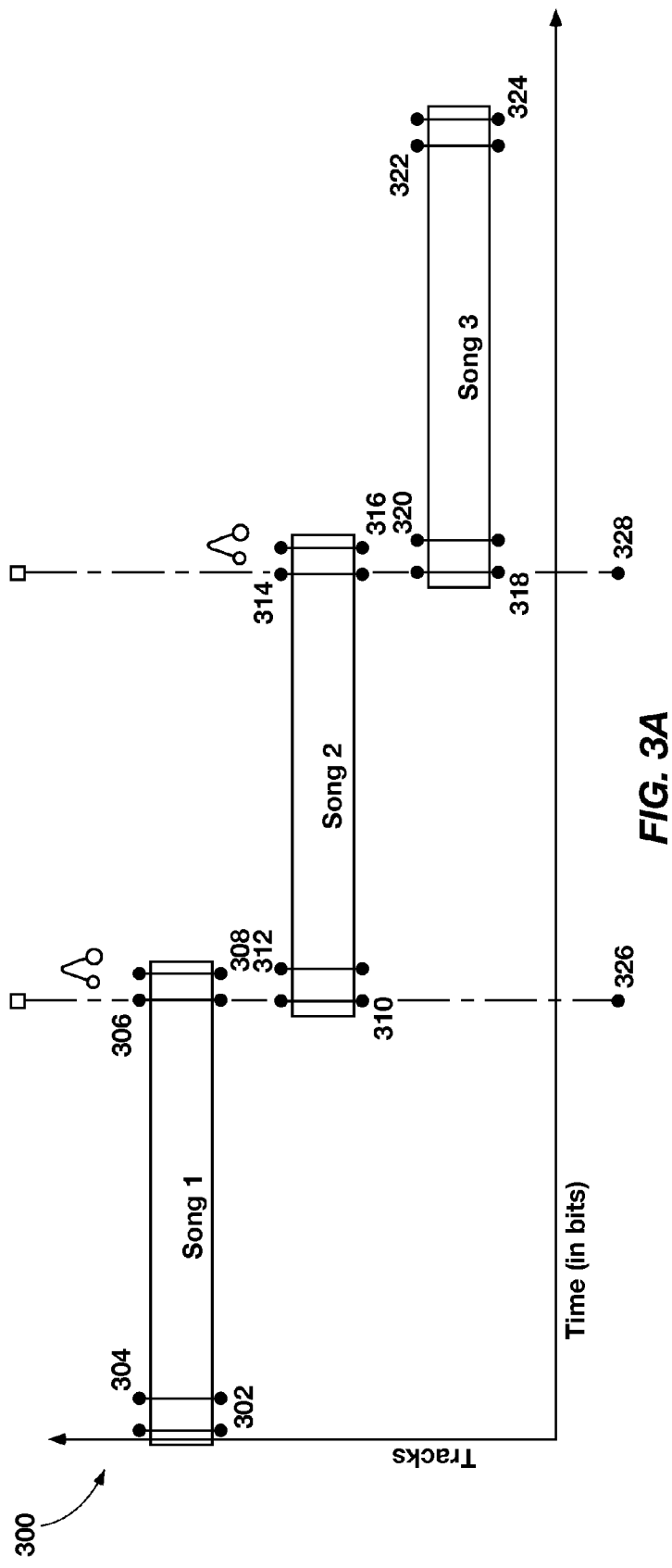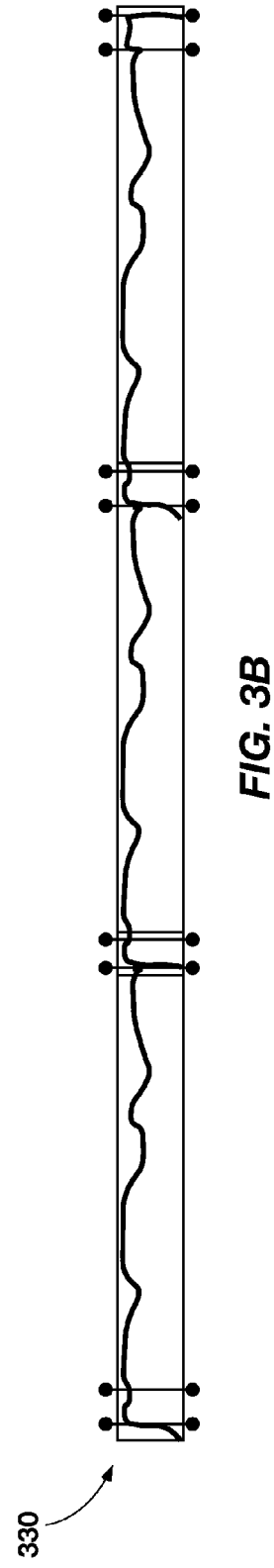

SERVER SIDE AUDIO FILE BEAT MIXING

CROSS-REFERENCE TO RELATED APPLICATION

This application is a utility conversion of U.S. Provisional Patent Application Ser. No. 61/045,186, filed Apr. 15, 2008, for "Server-Side Audio File Beat Mixing (SSAFBM)."

FIELD OF THE INVENTION

The present invention relates to a server-side audio file beat mixing.

DISCLOSURE OF THE INVENTION

A device for audio file beat mixing may include a website, a plurality of audio files, an audio processing server, audio mixing software (i.e., sound mixing engine), at least one audio processor and an audio encoder.

The website may be the front end of the invention where a client could create a mixed audio file including a custom play list of recordings that they desire to mix.

A database of mix-ready audio files (e.g., songs) is provided with corresponding Marker Time Stamp information—a collection of songs that have been tempo adjusted to one or more "base tempos." Base tempos are starting tempos of songs that are to be mixed. For example, a client might choose 128 beats per minute (BPM). The mix would select from songs that have a base tempo of 128 BPM. As shown in FIG. 1, which is a simplified schematic illustrating an example of an embodiment of a breakdown of a song 100, each song is formatted to have a Part 1 108, Part 2 110, and Part 3 112. The example shown in FIG. 1 is based on a 4 minute song with a tempo of 120 beats per minute at a 44.11 kHz sample rate. Therefore, total song file length including silence at a beginning and an end of the song file is 10,584,000 bits. Part 1 108 consists of a set number of musical beats (64 beats "intro" at 120 beats per minute equal to 1,411,200 samples for this example). The range of Part 1 108 is tagged by marker A 101 (the start of beat 1 of the range and Marker B 102 of the end of beat 64). The start of the fill 64 count intro directly following an ambient non-rhythmic sounds prior to this first beat (Marker A). Marker B is 64 beats after Marker A. The end of the 64 count intro is referred to as Part 1. Part 2 110 is the core sequence of sounds and beats encapsulating the essence or core of the song (can be of any length). Part 3 112 is the final substantive section of the song. Like Part 1, Part 3 112 contains an equal number of beats at the same tempo (64 beats at the end of song "outro" at 120 beats per minute equal to 1,411,200 samples in this example) and the range is tagged by Marker C 104 located at a time stamp of "X"-64 beats where "X" is the time stamp of the end of the final 64th beat of the 64 beat Part 3 112 section and Marker D 106 is the time stamp value of "X." Marker D the end of the 64 count outro; a short crash and delay may follow for a number of seconds. Markers 101, 102, 104 and 106 are represented in Bit Samples as Time Stamps as further explained hereunder and in FIG. 1. The database has associated with each song a record of the bit sample time stamp address referred to as time stamp throughout for the start and end points of Part 1 (Markers A and B), Part 2 110, and Part 3 (Markers C and D) so that in the mixing process, the "Parts" of a song can be accessed when needed. In the example in FIG. 1, the example Song has a Marker A 101 Time Stamp of 88,200, a Marker B 102 Time Stamp of 1,499,400, a Marker C 104 Time Stamp of 7,585,200, and a Marker D 106 Time Stamp of 10,407,600.

The audio processing server may include, for example, a computer server that processes the bit-by-bit mixing and processing of one song with another in a virtual multi-track environment. The audio processing server may also be used to convert the mixed audio file to a compressed format for delivery or pickup by a customer.

Mixing software may be used to combine the audio files (e.g., songs) and other sounds (Audio Bridge), apply audio processors, and convert the resulting file to new audio format.

Audio processors may be used to adjust a number of audio attributes including, but not limited to, amplitude (volume) of incoming signal, frequency response (EQ) of incoming signals, sound limiting or compression of the signal to reduce or eliminate distortion, phase shifters to remove any "phase cancellation" resulting from the exact placement of "similar beats over top of similar beats," automated stereo panning envelopes adjusting the left-right stereo image of one or more separate stereo tracks to provide interesting special effects, and time compression or expansion algorithms may be employed to adjust the speed of the audio file on a fixed or gliding/gradual basis.

An MP3 encoder or other encoder may be used to convert the mixed audio file to a compressed audio format suitable for quick download by a user of the service.

BRIEF DESCRIPTION OF THE DRAWINGS

FIGS. 3A and 3B are simplified diagrams illustrating an embodiment of a method of forming a mixed audio file according to embodiments of the present invention.

DETAILED DESCRIPTION OF THE INVENTION

Step 1: Project play list including at least one song is created and sent to mixing software to create a mixed audio file template.

Figure 1:
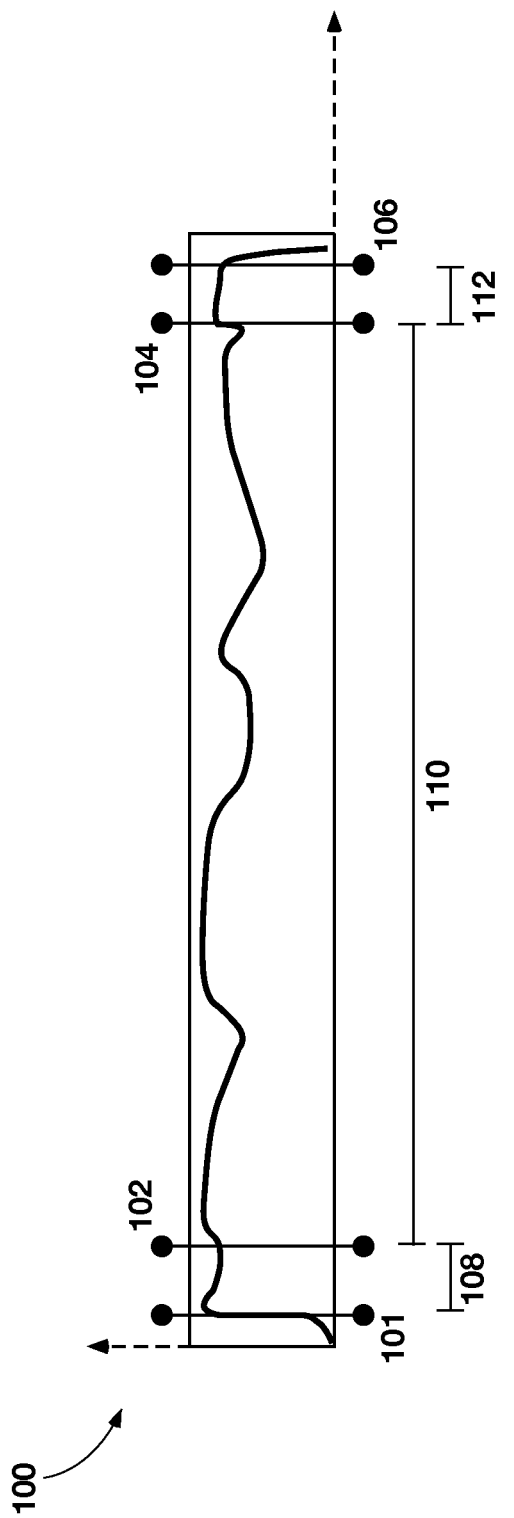
FIG. 1 is a simplified diagram illustrating an embodiment of a method of breaking down a song according to embodiments of the present invention.
Figure 2A:
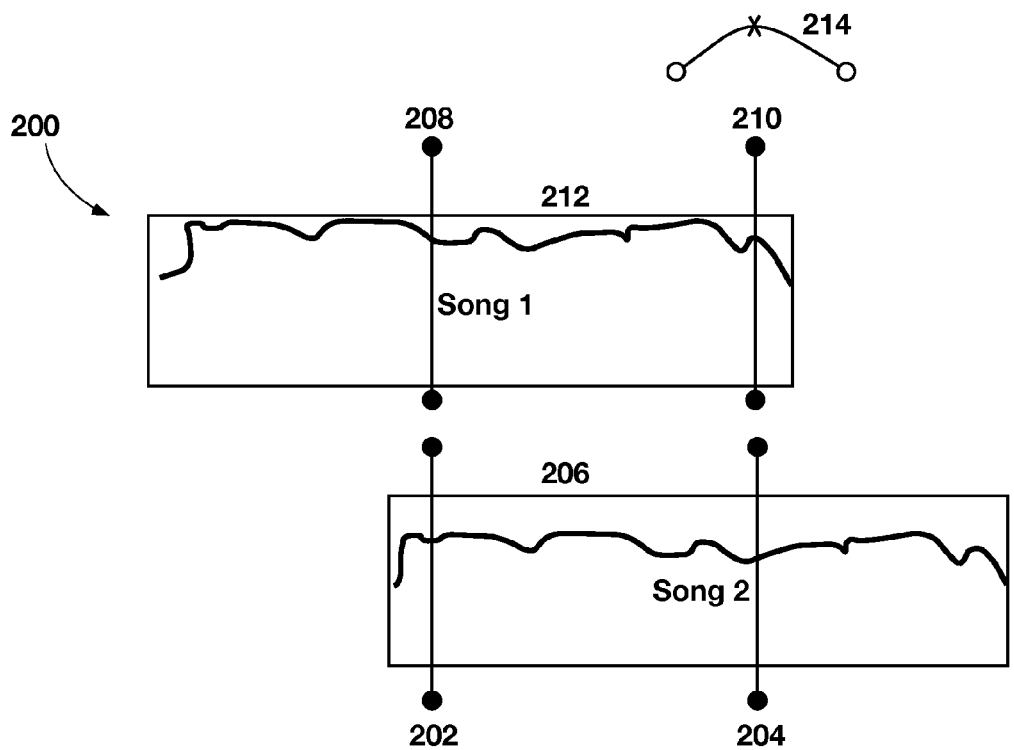
FIGS. 2A to 2C are simplified diagrams illustrating an embodiment of a method of forming a mixed audio file according to embodiments of the present invention.
Figure 2B:
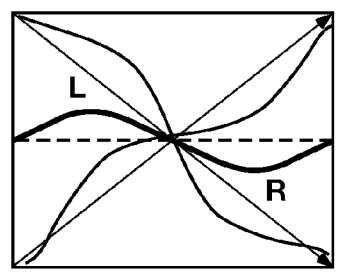

Step 2: The mixer software compiles song-related data from the database (e.g., Time Stamps of Marker Points, total number of bits in a song) related to each song that is selected for mixing as part of the mixed audio file and translates this into an instruction list that is further processed by the software invention. Specifically, a map is created by creating a time line (in bits) of the entire audio file by adding length of Part 1 of first song to Part 2 of each subsequent song, followed by Part 3 of the last song on the mixed audio file to determine the overall bit length of the mixed audio file. Time Stamp Location points of each Mix Region, defined below, are stored on the server to be accessed during the mix process so that Audio Processes can be applied to the Mix Region real-time during the re-sampling process. A Mix Region is defined as the range of time in the time line where two songs are being combined to create a blended mix of two songs within a mixed audio file, similar to DJ mixing. FIG. 2A is a simplified schematic diagram illustrating a position of tracks and audio bridge in time. As shown in FIG. 2A, the overall start point of each Mix Region is the point where Marker C 208 of Song 1 is aligned with Marker A 202 of Song 2. The end point of a mix region is where Marker D 210 of Song 1 meets Marker B 204 of Song 2. The Mix Region is illustrated in FIG. 2B and may include EQ filtering, amplitude adjustments/cross-fades and stereo imaging effect.

MIX REGION PROCESSING detailed: The mixer would set up a virtual multi-track workspace equal to the number of songs in a mixed audio file and the number of Audio Bridges required (FIG. 3). Multiple tracks of silence and audio data are combined bit by bit from the start of Songs 1 through the end of Song Y (where Y=the number of songs in a Project). The first significant audio mixing point begins at Marker C of Song 1, the first track in a Project. At this point, or even slightly prior to this point, audio bits from Song 2, Marker A, are mixed with Track A while a series of audio processors are applied for the length of the 64-Beat mix up to and through end point of the Mix Region where Marker D of Song 1 overlays Marker B of Song 2. Just before the end point of the Mix Region where Marker D and Marker B are aligned, a short 16-count "Audio Bridge" has been overlaid in the mix instructions to help transition from one song to the next.

Figure 2C:

FIG. 3A is a simplified schematic 300 illustrating a method of forming a mixed file by feeding multiple tracks into a mixer with Mix Regions and Audio Bridges. As shown in FIG. 3A, audio data is combined bit by bit from the start of Song 1 through the end of Song 3. The first significant audio mixing point begins at Marker C 306 of Song 1. At this point, or even slightly prior to this point, audio bits from Marker A 310 of Song 2, are mixed with Song 1 while a series of audio processors are applied for the length of the 64-beat mix up to and through end point of the Mix Region where Marker D 308 of Song 1 overlays Marker B 312 of Song 2. Just before the end point of the Mix Region where Marker D 308 and Marker B 312 are aligned, a short 16-count "Audio Bridge" (see FIG. 2C) has been overlaid in the mix instructions to help transition from one song to the next. At Marker C 314 of Song 2, or even slightly prior to this point, audio bits from Marker A 318 of Song 3, are mixed with Song 2 while a series of audio processors are applied for the length of the 64-beat mix up to and through end point of the Mix Region where Marker D 316 of Song 2 overlays Marker B 320 of Song 3. Just before the end point of the Mix Region where Marker D 316 of Song 2 and Marker B 320 of Song 3 are aligned, a short 16-count "Audio Bridge" (see FIG. 2C) may be overlaid in the mix instructions to help transition from one song to the next. FIG. 3B is a simplified schematic illustrating the final mixed file created using the method illustrated in FIG. 3A.

The Audio Bridge is simply a sound file that, when layered over the file at the end of a "Mix Region," helps smooth out any noticeable or abrupt transitions from one Song to another, commonly experienced when two songs of different production style are mixed. An Audio Bridge would have one Marker of note, Marker X. Marker X is the ninth beat in a 16-count bridge, but since the audio bridge is often non-rhythmic, it can be of any length and the "X" position can be set by the peak in amplitude of the segment. The sound prior to the ninth beat or Marker X would normally increase in amplitude or volume while the sounds after the peak of the ninth beat or Marker X would normally decrease in volume to fade out by the end of the 16 count bridge, as shown in FIGS. 2A, 3A and 3B.

Step 4: Once the entire mixed audio file has been processed or mixed, a Time Compression/Expansion process may be called to change the tempo of the mixed audio file from its base tempo (128 BPM) to any flat tempo or to a gliding tempo profile that can be selected during the mixed audio file creation process in Step 1. A mixed audio file can be gradually pitched up from the base tempo to a user-defined or static-option tempo higher or lower than the base tempo, or the entire mixed audio file could be shifted up or down in tempo entirely. This Step can also be accomplished during the real-time processing of the audio mixing.

Step 5: The mixed audio file may be converted to a new compressed format and posted for the customer to download.

What is claimed is:

1. A device for forming a compilation audio file, comprising:
   a website;
   a database comprising a plurality of audio files of complete songs;
   a server;
   audio mixing software; and
   at least one audio processor;
   wherein at least one of the server, the audio mixing software and the at least one audio processor are configured to:
     process the database for each of the plurality of audio files to define and store time stamp location points defining markers for:
       an intro section between a first intro marker at the start of a beat and a second intro marker at the end of a beat and comprising a predefined number of musical beats in a beginning part of the audio file; and
       an outro section between a first outro marker at the start of a beat and a second outro marker at the end of a beat and comprising the predefined number of musical beats in an end part of the audio file; and
     combine two or more selected audio files of the plurality of audio files sequentially and with a partial overlap to form the compilation audio file, the partial overlap for each of the two or more selected audio files comprising the outro section of the audio file and the intro section of a next subsequent audio file; and
     mix the outro section with the intro section for each partial overlap in the compilation audio file.

2. The device of claim 1, wherein the website enables a user to preview the plurality of the audio files.

3. The device of claim 1, wherein the website enables a user to select, re-order, and preview the two or more selected audio files and perform the mixing using the audio mixing software.

4. The device of claim 1, wherein the two or more selected audio files include the same tempo.

5. The device of claim 4, wherein the two or more selected audio files each have a related beat per minute.

6. The device of claim 1, wherein the mixing further includes mixing an audio bridge with the outro section and the intro section, wherein the audio bridge is configured to smooth abrupt transitions between the outro section of one audio file and the intro section of the next subsequent audio file.

7. The device of claim 1, wherein each of the intro section and the outro section for the two or more selected audio files include an identical number of beats at an identical tempo.

8. The device of claim 1, wherein at least one of the server, the audio mixing software and the at least one audio processor are configured to process the database to include first markers identifying the intro section and second markers identifying the outro section for each of the plurality of audio files.

9. The device of claim 1, wherein the server comprises a computer server configured to perform bit-by-bit mixing and processing of one audio file of the plurality with another audio file of the plurality in a virtual multi-track environment.

10. The device of claim 1, wherein the server is configured to convert compilation audio file to a compressed format.

11. The device of claim 1, wherein the at least one audio processor is configured to adjust a number of audio attributes selected from the group consisting of amplitude of incoming signal, frequency response (EQ) of incoming signals, sound limiting or compression of an incoming signal to reduce or eliminate distortion, phase cancellation, left-right stereo image, and speed of one or more of the plurality of audio files.

12. The device of claim 1, further comprising an audio encoder configured for converting the compilation audio file to a compressed audio format.

13. A method of forming a compilation audio file, comprising:
   selecting two or more audio files having a similar tempo from a plurality of audio files of complete songs in a database;
   processing each of the two or more audio files to define and store time stamp location points defining markers for:
      an intro section between a first intro marker at the start of a beat and a second intro marker at the end of a beat and comprising a predetermined number of musical beats in a beginning part of the audio file; and
      an outro section between a first outro marker at the start of a beat and a second outro marker at the end of a beat and comprising the predetermined number of musical beats in an end part of the audio file;
   mixing the two or more audio files using mixing software by:
      combining the two or more audio files sequentially and with a partial overlap; and
      mixing the outro section of each of the two or more audio files with the intro section of a next subsequent audio file in the sequentially combined two or more audio files to form the compilation audio file.

14. The method of claim 13, wherein mixing the audio file further comprises assembling a non-stop mix.

15. The method of claim 13, further comprising creating a listing of the audio files, re-ordering the audio files, and previewing a sequence of the audio files.

16. The method of claim 13, further comprising compressing the compilation audio file.

\* \* \* \* \*